(12) United States Patent
Volker

(10) Patent No.: US 6,196,205 B1
(45) Date of Patent: Mar. 6, 2001

(54) FUEL CONTROL SYSTEM FOR GAS-OPERATED ENGINES

(75) Inventor: Frank A. Volker, Washington, MO (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/351,553

(22) Filed: Jul. 12, 1999

(51) Int. Cl.$^7$ .................................................. F02B 43/00
(52) U.S. Cl. ................................. 123/529; 123/527
(58) Field of Search ............................. 123/525, 526, 123/527, 529, 685, 688, 690

(56) References Cited

U.S. PATENT DOCUMENTS

| | | |
|---|---|---|
| 1,507,292 | 9/1924 | Kettering et al. . |
| 3,651,794 | 3/1972 | Douglas . |
| 3,782,347 | 1/1974 | Schmidt et al. . |
| 4,029,061 | 6/1977 | Asano . |
| 4,089,311 | 5/1978 | Brettschneider et al. . |
| 4,103,649 | 8/1978 | Matumoto et al. . |
| 4,120,270 | 10/1978 | Asano et al. . |
| 4,306,531 * | 12/1981 | Watkins ................................. 123/525 |
| 4,389,990 | 6/1983 | Murray . |
| 4,449,509 | 5/1984 | Young . |
| 4,450,821 * | 5/1984 | Venning et al. ....................... 123/525 |
| 4,541,397 | 9/1985 | Young . |
| 4,545,356 | 10/1985 | Casey . |
| 4,574,763 * | 3/1986 | Hallberg ................................. 123/527 |
| 4,597,364 * | 7/1986 | Young .................................... 123/526 |
| 4,675,589 | 6/1987 | Sausner et al. . |
| 4,721,078 | 1/1988 | Watanabe et al. . |
| 4,953,516 | 9/1990 | van der Weide et al. . |
| 5,031,593 | 7/1991 | Erhard et al. . |
| 5,224,347 | 7/1993 | Yakabe et al. . |
| 5,237,983 * | 8/1993 | Willey et al. ........................... 123/688 |
| 5,243,954 * | 9/1993 | Moss ...................................... 123/688 |
| 5,329,908 * | 7/1994 | Tarr et al. .............................. 123/527 |
| 5,367,999 | 11/1994 | King et al. . |
| 5,377,646 | 1/1995 | Chasteen . |
| 5,474,053 | 12/1995 | Suzuki . |
| 5,482,024 | 1/1996 | Elliott . |
| 5,509,393 * | 4/1996 | Leaf et al. ............................. 123/529 |
| 5,529,048 | 6/1996 | Kurihara et al. . |
| 5,533,492 | 7/1996 | Willey et al. . |
| 5,549,097 | 8/1996 | Nimberger . |
| 5,575,266 * | 11/1996 | Iida ....................................... 123/680 |
| 5,584,467 | 12/1996 | Harnett et al. . |
| 5,615,661 * | 4/1997 | Suzuki ................................... 123/688 |
| 5,690,078 | 11/1997 | Ofner . |
| 5,755,210 | 5/1998 | Sato et al. . |

FOREIGN PATENT DOCUMENTS 0064373    11/1982   (EP) .

* cited by examiner

*Primary Examiner*—Erick Solis
(74) *Attorney, Agent, or Firm*—Reising, Ethington, Barnes, Kisselle, Learman & McCulloch, P.C.

(57) ABSTRACT

A fuel control system for delivering gaseous fuel from a source to a gas-operated engine that includes a normally open electronic control valve connected between the fuel source and the engine, and responsive to electronic valve control signals for variably closing connection between the source and the engine. An electronic control unit supplies the electronic valve control signals responsive to engine operation. The electronic control unit includes facility for responding to termination of engine operation by automatically generating a valve control signal to hold the valve fully closed for a preselected time duration. This preselected time duration preferably includes a fixed minimum time duration and a user-programmable additional valve closure time duration.

26 Claims, 1 Drawing Sheet

FUEL CONTROL SYSTEM FOR GAS-OPERATED ENGINES

The present invention is directed to gas-operated internal combustion engines, such as liquid petroleum (LP) and natural gas engines. The invention is more specifically directed to a system and method for controlling delivery of gaseous fuel from a source to a gas-operated engine.

BACKGROUND AND SUMMARY OF THE INVENTION

In conventional gas-operated engines, gaseous fuel, such as LP fuel or natural gas, is fed from a source under pressure through a pressure regulator/vaporizer to a mixer or carburetor. The pressure regulator/vaporizer functions to feed gas vapor at constant pressure to the mixer. The mixer functions to mix the gaseous fuel with air, and to feed the mixture to the engine intake manifold for transmission to the cylinder intake ports. It is important in fuel delivery systems of this character to provide a mechanism for terminating fuel flow when the engine ceases operation to help insure that fuel vapor will not flow to the hot engine and potentially cause a combustible mixture to form in the exhaust manifold.

It is a general object of the present invention to provide a fuel control system and method for gas-operated engines in which fuel flow is affirmatively terminated when engine operation ceases. Another object of the present invention is to provide a fuel control system and method for gas-operated engines that obtain improved control of air/fuel ratio during all phases of engine operation.

A fuel control system for delivering gaseous fuel from a source to a gas-operated engine in accordance with one aspect of the present invention includes a normally open electronic control valve for connection between the fuel source and the engine, and responsive to electronic valve control signals for variably closing connection between the source and the engine. An electronic control unit, for supplying the electronic signals responsive to engine operation, includes facility responsive to termination of engine operation for automatically generating a valve control signal to hold the valve fully closed for a preselected time duration. This preselected time duration preferably includes a fixed minimum time duration and a user-programmable additional valve closure time duration.

In accordance with another aspect of the present invention, the system includes an oxygen sensor for operative coupling to the engine to supply a signal indicative of air/fuel ratio around a stoichiometric value, and at least one additional sensor for supplying an electrical sensor signal as a function of engine operation. The electronic control unit includes an electronic memory in which a table of base valve control signals is stored. The control unit is responsive to electrical signals from the at least one additional sensor for obtaining a corresponding base control signal from the table. The control unit is also responsive to a signal from the oxygen sensor for modifying the base control signals as a function of air/fuel ratio at the engine, and applying the modified control signals to the electronic control valve. The control unit is also responsive to absence of a usable signal from the oxygen sensor for providing the valve control signal in a predetermined manner independent of the table. In the preferred embodiment of the invention, the electronic control unit is responsive to absence of a usable signal from the oxygen sensor upon initial start-up, when the engine has not been operating for a sufficient time for the oxygen sensor to reach operating temperature, and in the event of malfunction or severed connection to the sensor. The oxygen sensor in the preferred embodiment of the invention supplies an electrical signal that toggles or changes state at the stoichiometric value of the air/fuel ratio. Malfunction at or a severed connection to the cable is sensed as a failure of the sensor output signal to toggle for a preselected time duration, which is selectively programmable by a user. In this event, a control signal is applied to the valve to place or "park" the valve at the most recent position at which the oxygen sensor toggled from lean to rich. At start-up, the valve is positioned or "parked" at a preselected percentage of a fully opened condition, which again is preferably programmable by a user.

In the preferred embodiment of the invention, several parameters of valve control are selectively programmable by a user, including rate of change of the control signal as the signal from the oxygen sensor varies or toggles around the stoichiometric value. Rate of change may be selectively programmed in the preferred embodiment of the invention at differing rates for when the signal from the oxygen sensor varies from rich to lean and from lean to rich. In this way, the system may be biased toward either rich or lean operation. Other valve control parameters that are selectively programmable by the user include speed of valve movement, valve damping, the maximum closed and minimum open positions, and filtration of the input signal from the engine sensor, which preferably comprises a manifold air pressure sensor. In accordance with another feature or aspect of the present invention, the electronic control unit is coupled to a status light on an operator panel, and is programmed to flash the status light at intervals and durations indicative of differing operating conditions at the engine. All features or aspects of the invention may be implemented separately from, or more preferably in combination with, each other.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
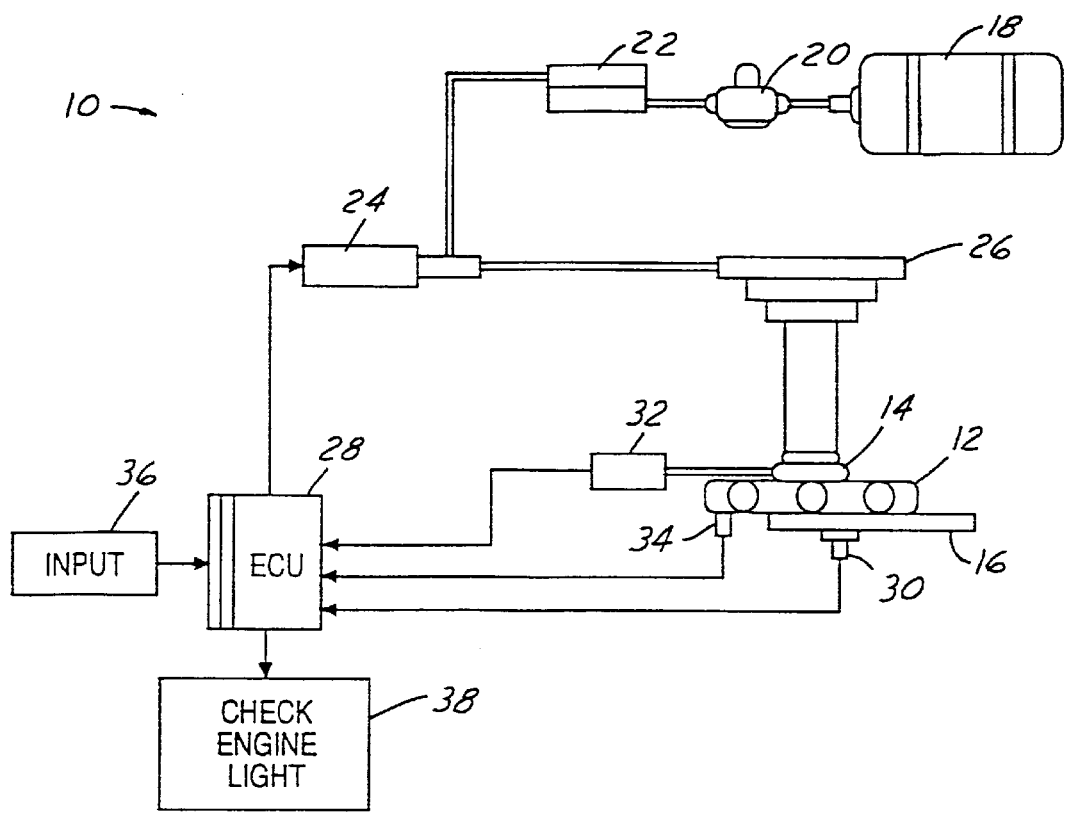
FIG. 1 is a schematic diagram of a fuel delivery system for a gas-operated engine in accordance with one presently preferred embodiment of the invention.

FIG. 1 illustrates a fuel delivery system 10 that includes an engine 12 having an engine intake manifold 14 and an exhaust line 16. A tank 18 contains fuel, such as liquid petroleum fuel, under pressure. The outlet of tank 18 is connected to a solenoid-operated flow control valve 24 through a high-pressure lock-off valve 20 and a vaporizer/pressure regulator 22. The outlet of valve 24 is connected to a mixer/carburetor 26, in which the fuel is mixed with intake air and fed to engine intake manifold 14. Thus, fuel from tank 18 is vaporized at 22 and fed at regulated pressure to flow control valve 24. Fuel from valve 24 is mixed with air at 26, and fed to engine intake manifold 14 for combustion at engine 12.

An electronic control unit or ECU 28 receives an input signal from an exhaust oxygen sensor 30 mounted on exhaust line 16. A manifold air pressure sensor 32 is responsive to pressure within manifold 14 for supplying a corresponding signal to ECU 28. An engine speed sensor 34 is responsive to the speed of operation at engine 12 for supplying a corresponding signal to ECU 28. ECU 28 receives input information from an operator input unit 36, such as a suitably programmed personal computer. ECU 28 provides control signals to valve 24 as a pulse-width modulated output to the solenoid of the control valve. ECU 28 is also connected to one or more lamps 38, such as a check-engine light at the vehicle dashboard, for indicating engine operating status and fault conditions to an operator.

Figure 2:
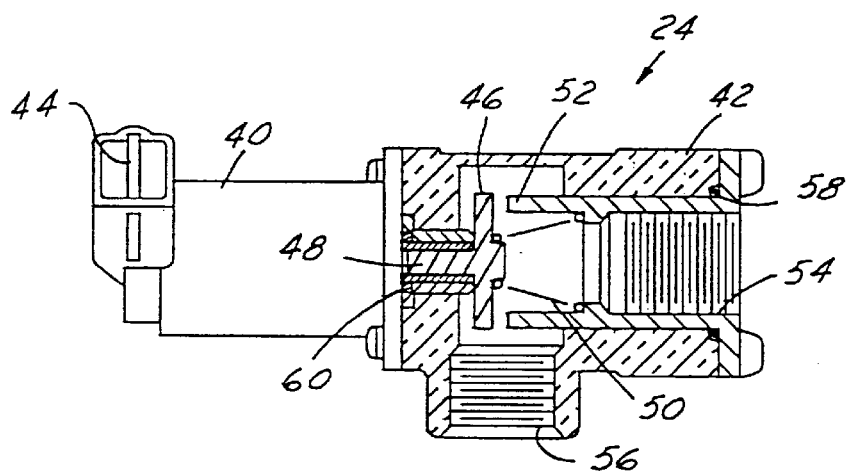
FIG. 2 is a partially sectioned elevational view of the fuel delivery control valve in the system of FIG. 1.

FIG. 2 illustrates control valve 24 in greater detail. A solenoid coil 40 is mounted on one end of a valve body 42. Solenoid coil 40 has a connector 44 for connection to ECU 28 (FIG. 1). A valve disk 46 is carried by the armature 48 of solenoid coil 40, and is normally biased by a conical coil spring 50 away from a valve seat 52. Thus, valve 24 is a normally open valve, which means that fuel may normally flow from an inlet 54 to an outlet 56 in valve body 42 in the absence of suitable control signals to solenoid 40. Pulse-width modulated control signals to solenoid 40 from ECU 28 selectively moves valve disk 46 toward seat 52 against the force of spring 50 for modulating flow of fuel to the engine. O-rings 58, 60 are provided for sealing valve body 42.

In accordance with the preferred embodiment of the invention, base valve control signals are stored in electronic memory within ECU 28, which preferably is a suitably programmed microprocessor-based ECU. These base valve control signals preferably are stored in the form of a look-up table as a function of manifold air pressure from sensor 32 and engine speed from sensor 34. In a presently preferred embodiment of the invention, the fuel map table comprises an eight-by-eight table having sixty-four entries, typically between about 12% and 90% open at the valve. Thus, for a given engine speed and manifold air pressure, there is a corresponding base valve control signal in the stored electronic table that seeks to achieve stoichiometric operation at the engine. These base control signals are calibrated and stored in any suitable manner, such as that disclosed in U.S. Pat. No. 5,091,858 assigned to the assignee hereof. Thus, for a given manifold air pressure and engine speed, ECU 28 can obtain a base control signal from the look-up table, which provides a base pulse width for application to control valve 24. In the event of a change in engine operating conditions, such as an increase in engine demand and a corresponding change in manifold air pressure, ECU 28 obtains a corresponding new base valve control signal from the look-up table. Other engine condition sensors, such as an engine temperature sensor and a throttle position sensor, can be employed for selectively modifying the base control signal, as disclosed in above-noted U.S. Pat. No. 5,091,858, the disclosure of which is incorporated herein by reference for purposes of background.

Closed-loop fuel control is obtained in accordance with one aspect of the present invention by means of oxygen sensor 30 coupled to engine exhaust 16. Oxygen sensor 30 preferably is of conventional construction, providing a bistable electrical output signal to ECU 28 that toggles or changes state as the air/fuel ratio passes through the stoichiometric level. Thus, the output of oxygen sensor 30 will be at one voltage level when the air/fuel ratio is above the stoichiometric level, and will be at a second voltage level when the air/fuel ratio is below the stoichiometric level. The output of the oxygen sensor is monitored by ECU 28 to detect a change of state between rich and lean conditions. If a lean condition is detected, the base valve control signal from the look-up table is modified within ECU 28 so that valve 24 is moved to a more open position to allow more fuel to mix with the intake air. If a rich condition is detected, the base valve control signal from the look-up table is sufficient so that the valve is moved toward a more closed position, decreasing the amount of fuel added to the intake air. The output of sensor 30 is monitored at preselected intervals, and valve 24 is then moved incrementally to force the bistable output of sensor 30 to change state or toggle. This incremental trimming of the base valve control signal continues indefinitely until a changed input from sensor 32 or 34 causes a new base control signal to be obtained.

One important feature of the present invention is to provide default settings for the valve control signal when the oxygen sensor output does not toggle state, such as when the engine has not been running for a time sufficient for the oxygen sensor to reach operating temperature, or when there is a malfunction at or severed connection to the sensor. At start-up, valve 24 will be set or "parked" at a percentage of the fully closed condition that is user programmable, as will be described. This is usually around 45% to 50% closed. During all other scenarios in which the oxygen sensor does not change state, ECU 28 detects an apparent malfunction at the sensor, and the valve is positioned or "parked" at the most recent position at which the oxygen sensor toggled from lean to rich. If the valve has already been moved to a maximum distance (either open or closed) permitted by the corresponding user-programmed parameter as will be described, the system is run open-loop, and a base valve control signal obtained from the look-up table in ECU 28 is used without modification for valve control purposes. In all movements, if the output of the oxygen sensor fails to toggle at a previous toggle point, rate of movement at the valve is increased. When oxygen sensor toggling then resumes, the rate of movement is decreased for direction reversal.

In accordance with another feature of the present invention, ECU 28 may be connected to an operator input device 36, such as a suitably programmed personal computer, for selectively setting and varying various control parameters. These control parameters preferably include:

(1) Valve movement speed, which determines how fast the valve moves in making its initial adjustment to the value obtained from the fuel map in the look-up table. This value represents the number of counts that are added to or subtracted from the "on" time for the pulse-width modulated control value obtained from the look-up table. The output of oxygen sensor 30 determines the direction of movement.

(2) Damping value, which controls the time interval between each update of the pulse-width modulated control signal. This helps account for the fact that the oxygen sensor does not instantly detect changes in air/fuel mixture.

(3) Trim region around the point obtained from the look-up table, which controls the permitted range of trimming of the table base value.

(4) Maximum closed percent, which sets the maximum permitted closed percent at the valve. A typical value may be sixty percent closed.

(5) Minimum closed percentage at the valve, which may be on the order of twelve percent.

(6) Default percent closed on engine start-up. Until the engine temperature increases to operating temperature, fuel table readings and oxygen sensor output are not used. A typical value may be forty-five percent.

(7) A trim point bias toward either lean or rich operation. This feature takes advantage of the time lag in the output of the oxygen sensor to changes from rich to lean or lean to rich at the fuel input. To bias the air/fuel ration to a richer level than the stoichiometric level, the valve opening rate in response to a rich-to-lean toggle at the oxygen sensor is set greater than the valve closing rate in response to a lean-to-rich toggle at the oxygen sensor. This causes the valve to overshoot the stoichiometric level by opening slightly farther than required. Since the valve closing rate is less, the valve will spend more time in the rich region. This overshoot is controlled by this control parameter, called "trim bias." The bias may also be set to a lean condition, or to zero. Other parameters that may be set by the user include filtration of the manifold air pressure sensor output, and time delay before failure of the oxygen sensor output to toggle will indicate a fault condition.

In accordance with another feature of the invention, the user may program ECU 28 to hold valve 24 closed for a programmed timed duration after operation is terminated at engine 12. This helps prevent gaseous fuel collected in vaporizer 12 and the fuel lines from migrating through mixer 26 into manifold 14 and into the hot exhaust manifold. ECU 28 preferably is programmed to hold valve 24 closed for a minimum time duration after the engine terminates operation, such as a time duration of five seconds. This time duration may be selectively increased by user programming, with a typical programmed parameter value being thirty seconds, thereby holding valve 24 closed for a total of thirty-five seconds after the engine terminates operation.

In accordance with yet another feature of the present invention, ECU 28 is programmed to flash light 38 at intervals and durations indicative of differing operating conditions at engine 12. The following table is illustrative, with "long" flashes being on the order of about one second in duration, and "short" flashes being on the order of about 0.5 seconds in duration. There is approximately a two second interval between flash codes:

responsive to electronic valve control signals for variably closing connection between the source and the engine, and an electronic control unit for supplying said electronic control signals responsive to engine operation, said electronic control unit including means for responding to termination of operation at the engine by automatically generating a control signal to hold said valve fully closed for a preselected time duration.

2. The system set forth in claim 1 wherein said electronic control unit includes means for selectively programming said preselected time duration.

3. The system set forth in claim 2 wherein said electronic control unit includes means for setting a fixed minimum time duration, and means for selectively programming said preselected time duration in addition to said fixed minimum time duration.

4. The system set forth in claim 1 further comprising:

an oxygen sensor for operative coupling to the engine to supply a signal indicative of air/fuel ratio around a stoichiometric value, and at least one additional sensor for supplying an electrical sensor signal as a function of engine operation, said electronic control unit including an electronic memory storing base valve control signals in a table, means responsive to said electrical sensor signal for obtaining a corresponding base valve control signal from said table, means responsive to said oxygen sensor for modifying said base valve control signal as a function of air/fuel ratio at the engine, and means responsive to absence of a usable signal from said oxygen sensor for selectively setting said valve control signal in a predetermined manner.

| Diagnostic Codes | | | | |
|---|---|---|---|---|
| Device | Open | Shorted | General Failure | OK |
| ECU Processor | N/A | N/A | N/A | 10 short |
| Battery | N/A | N/A | 1 long 1 short | N/A |
| O$_2$ Sensor | N/A | N/A | 1 long 2 short | N/A |
| MAP Sensor | 1 long, 3 short | 1 long, 4 short | N/A | N/A |
| Water Temp Sensor | 1 long, 5 short | 1 long, 6 short | N/A | N/A |
| Air Temp (EFI) | 1 long, 7 short | 1 long, 8 short | N/A | N/A |
| Governor Actuator | 2 long, 1 short | 2 long, 2 short | N/A | N/A |
| IAC Actuator | 2 long, 3 short | 2 long, 4 short | N/A | N/A |
| OETune/Low Press Valve | 3 long, 1 short | 3 long, 2 short | N/A | N/A |
| Lock-off Valve | 3 long, 3 short | 3 long, 4 short | N/A | N/A |

There have therefore been disclosed a system and method for delivering gaseous fuel to a gas-operated engine that fully satisfy all of the objects and aims previously set forth. The presently preferred embodiment of the invention has been disclosed, together with a number of possible modifications and variations. Other modifications and variations will readily suggest themselves to persons skilled in the art. The invention is intended to encompass all such modifications and variations as fall within the spirit and broad scope of the appended claims.

What is claimed is:

1. A fuel control system for delivering gaseous fuel from a source to a gas-operated engine, which comprises:

a normally open electronic control valve for connection between the source and the engine, said valve being 5. The system set forth in claim 4 wherein said means responsive to absence of a usable signal comprises means for setting said valve control signal at a preselected level independent of said table upon the initial operation of the engine.

6. The system set forth in claim 5 further comprising means for selectively programming said preselected level.

7. The system set forth in claim 4 wherein said oxygen sensor supplies a bistable electrical signal that toggles at the stoichiometric value of the air/fuel ratio, and wherein said means responsive to absence of a usable signal comprises means responsive to absence of toggling of said signal to set said valve control signal to a level equal to the level of said valve control signal when said signal last toggled from lean to rich.

8. The system set forth in claim 7 further comprising means for selectively programming time duration of absence of toggling, after which said control signal is set at said level.

9. The system set forth in claim 4 further comprising means for selectively programming rate of change of said valve control signal as said signal from said oxygen sensor varies around said stoichiometric value.

10. The system set forth in claim 9 wherein said means for selectively programming rate of change includes means for selectively programming differing rates of change as said signal from said oxygen sensor varies from rich to lean and lean to rich so as to bias said system toward either rich or lean operation.

11. The system set forth in claim 4 further comprising means for selectively programming maximum and minimum levels of said valve control signal.

12. The system set forth in claim 1 further comprising operator display means coupled to said electronic control unit for indicating status of operation at the engine.

13. The system set forth in claim 12 wherein said operator display means comprises a warning light, and wherein said electronic control unit includes means for flashing said light at intervals and durations indicative of differing operating conditions at the engine.

14. A fuel control system for delivering gaseous fuel from a source to a gas-operated engine, which comprises:
- a control valve for connection between the source and the engine, and being responsive to electronic valve control signals for variably feeding fuel to the engine,
- an oxygen sensor for operative coupling to the engine to supply a signal indicative of air/fuel ratio around a stoichiometric value,
- at least one additional sensor for supplying an electrical sensor signal as a function of engine operating conditions, and
- an electronic control unit including an electronic memory storing base valve control signals in a table, means responsive to said electrical sensor signal for obtaining a corresponding base valve control signal from said table, means responsive to said oxygen sensor for modifying said base valve control signal as a function of air/fuel ratio at the engine, and means responsive to absence of a usable signal from said oxygen sensor for selectively setting said base valve control signal in a predetermined manner,
- wherein said oxygen sensor supplies a bistable electrical signal that toggles at the stoichiometric value of the air/fuel ratio, and wherein said means responsive to absence of a usable signal comprises means responsive to absence of toggling of said signal to set said valve control signal to a level equal to the level of said valve control signal when said signal last toggled from lean to rich.

15. The system set forth in claim 14 wherein said means responsive to absence of a usable signal comprises means for generating said control signal at a preselected level independent of said table upon the initial operation of the engine.

16. The system set forth in claim 15 further comprising means for selectively programming said preselected level.

17. The system set forth in claim 14 further comprising means for selectively programming time duration of absence of toggling, after which said control signal is set at said level.

18. The system set forth in claim 14 further comprising means for selectively programming rate of change of said valve control signal as said signal from said oxygen sensor varies around said stoichiometric value.

19. The system set forth in claim 18 wherein said means for selectively programming rate of change includes means for selectively programming differing rates of change as said signal from said oxygen sensor varies from rich to lean and lean to rich so as to bias said system toward either rich or lean operation.

20. The system set forth in claim 14 further comprising means for selectively programming maximum and minimum levels of said valve control signal.

21. The system set forth in claim 14 wherein said control valve comprises a normally open control valve, and wherein said electronic control unit including means for responding to termination of operation at the engine for automatically generating a valve control signal to hold said valve fully closed for a preselected time duration.

22. The system set forth in claim 21 wherein said electronic control unit includes means for selectively programming said preselected time duration.

23. The system set forth in claim 22 wherein said electronic control unit includes means for setting a fixed minimum time duration, and means for selectively programming said preselected time duration in addition to said fixed minimum time duration.

24. The system set forth in claim 14 further comprising operator display means coupled to said electronic control unit for indicating status of operation at the engine.

25. The system set forth in claim 24 wherein said operator display means comprises a warning light, and wherein said electronic control unit includes means for flashing said light at intervals and durations indicative of differing operating conditions at the engine.

26. A method of controlling delivery of gaseous fuel from a source to a gas-operated engine, comprising the steps of:
- (a) connecting a normally open electronic control valve between the source and the engine,
- (b) upon termination of operation of the engine, closing said valve by applying a control signal to said valve for a preset time duration.

* * * * *